United States Patent [19]

Yoo et al.

[11] Patent Number: 5,546,478
[45] Date of Patent: Aug. 13, 1996

[54] PICTURE PRINT CONTROLLING DEVICE

[75] Inventors: Choon K. Yoo; Young G. Kim, both of Suwon, Rep. of Korea

[73] Assignee: Samsung Electronics Co., Ltd., Kyungki-do, Rep. of Korea

[21] Appl. No.: 282,508

[22] Filed: Aug. 1, 1994

[30] Foreign Application Priority Data

Jul. 30, 1993 [KR] Rep. of Korea .................. 93-14673

[51] Int. Cl.$^6$ ........................................... G06K 9/20
[52] U.S. Cl. ............................... 382/282; 348/588
[58] Field of Search ............................ 358/453, 538; 345/119, 120, 146; 382/8, 9, 16, 17, 28, 34, 166, 282, 283, 305, 191; 348/588, 584, 596

[56] References Cited

U.S. PATENT DOCUMENTS

| | | | |
|---|---|---|---|
| 4,920,337 | 4/1990 | Kuo | 340/721 |
| 4,979,225 | 12/1990 | Tsujiuchi et al. | 382/17 |
| 5,105,466 | 4/1992 | Tsujiuchi et al. | 382/1 |
| 5,119,207 | 6/1992 | Niitsuma et al. | 358/296 |
| 5,231,517 | 7/1993 | Taguchi | 358/453 |
| 5,258,859 | 11/1993 | Wada et al. | 358/487 |
| 5,278,669 | 1/1994 | Takemoto | 358/453 |
| 5,289,168 | 2/1994 | Freeman | 345/121 |

*Primary Examiner*—Yon J. Couso
*Attorney, Agent, or Firm*—Sughrue, Mion, Zinn, Macpeak & Seas

[57] ABSTRACT

The present invention is a picture print controlling device. Complex image signals which are input to the device are stored in memory and a picture is displayed on a monitor and/or is printed on a photographic paper. The addresses of a printed picture corresponding to a predetermined area of the monitor screen are separated from the remaining addresses of the screen and stored in designated addresses so that just the picture of the predetermined area can be printed and the remainder of the picture may not printed. If printed, data of the designated addresses are sequentially read to be printed. Furthermore, a user can choose the size and location of the predetermined area of the selected cut partial picture. In addition, the device of this invention may be applied to a picture print device such as a color video printer.

9 Claims, 7 Drawing Sheets

PICTURE PRINT CONTROLLING DEVICE

BACKGROUND OF THE INVENTION

1. Field of the Invention

The present invention relates to a picture print controlling device. More particularly, it relates to a picture print controlling device that is capable of defining a predetermined area of a monitor screen so that a user is able to selectively print and store image information corresponding to a predetermined area of the screen. Consequently, the user can print just the predetermined area on photographic paper, without printing the image information of the remaining area of the screen. Thus, the picture print controlling device may print an image signal having a predetermined location and a predetermined size within the monitor screen according to commands from the user.

Korean Patent Application No. 93-14673 is incorporated herein by reference for all purposes.

2. Description of the Prior Art

According to the widely-used technique of printing pictures, complex image signals are stored as digital signal in memory, and all of the stored digital signal are read out of memory to print the entire picture. Furthermore, a first picture displayed on a monitor can be partitioned into four or nine parts, and a second picture can be displayed on the monitor by overlaying the second picture on one of the four or nine parts via picture-in-picture (PIP) technology. However, when a user desires to print the image displayed on the monitor, the total image (including both the first and second pictures) must be printed instead of only a portion of the image. These compilation techniques have been already disclosed by various patent applications.

FIG. 1 depicts a circuit block diagram of a device which stores complex image signals as digital signals and converts the digital signals back into analog signals to display them on a screen of a monitor. The block diagram also shows the steps for printing the screen displayed on the monitor by a thermal transmission technique. An example of the device illustrated in FIG. 1 is described in U.S. Pat. No. 4,573,197.

According to FIG. 1, a Y/C separator 10 separates complex image signals into a luminance signal Y and a color signal C. The separated luminance signal Y and color signal C are decoded as red, green, and blue signals R, G, and B in a decoder 20, and input as matrix signals into an analog/digital converter 30. The analog/digital converter 30 converts the matrix signals to digital signals based on an analog/digital conversion clock signal ADCK which is output from a controller 100. The analog/digital converter then outputs the digital matrix signals to a memory cell 40. These digital matrix signals are input to the memory cell 40 and stored according to a control signal of the controller 100. Moreover, the digital matrix signals are stored sequentially by address.

The signals stored in the memory cell 40 may be output from the memory 40 to a digital/analog converter 50 according to a control signal and an address signal of the controller 100. Similarly, the signals may also be output from the memory cell 40 to a print processor 80 according to a control signal and an address signal of the controller 100.

The signals input by the digital/analog converter 50 are converted to analog signals. Subsequently, the analog signals are encoded by an encoder 60 and output to a monitor (not illustrated) as complex image signals.

The digital signals input by the print processor 80 are divided into two types of data, data 1 and data 2. The portion of the signals which are radix line data are considered "data 1" data, and the portion which are even line data are considered "data 2" data. The divided signals are then input to a thermal transmitting head 90. The thermal transmitting head 90 sequentially prints an image represented by data 1 and data 2 on a photographic paper by a clock signal, a strobo signal, and a latch signal produced by the print processor 80.

A technique for storing the digital signals, that were converted from the complex image signals to red, green and blue matrix signals, in a memory cell is illustrated by FIG. 2.

FIG. 2A shows an internal construction of the memory cell 40 for storing the digital signal data. In this example, digital data consisting of O, X, Δ and □ are sequentially stored in the memory cell 40. If the digital data are read sequentially according to the clock signals as shown in FIG. 2B, the digital data of O, X, Δ and □ are converted into complex image signals and are displayed sequentially on a monitor as shown in FIG. 2C.

The complex image signals to be displayed on the screen are converted to digital signals in the following order. The complex image signal which will be displayed in the upper left portion of the screen is converted into digital data first. The conversion continues by converting the complex image signals which will be displayed from the left of the screen to the right of the screen and then from the top of the screen to the bottom of the screen. Then, the digital data signals are sequentially stored in sequential addresses of the memory cell 40. In addition, the digital signals are sequentially read from the sequential addresses of the memory cell so that the complex image signals are properly displayed from the left of the screen to the right of the screen and then from the top of the screen to the bottom of the screen.

A method for sequentially storing the digital signals converted from the complex image signals in sequential addresses of the memory is described with reference to FIG. 3.

The screen of the monitor which displays the complex image signals is partitioned into row and column addresses of a matrix. The overall screen is divided by m row addresses and n column addresses. Therefore the digital signals may be stored in the memory cell according to the corresponding m and n screen address.

FIG. 4 is a circuit diagram for explaining the construction of a conventional picture print control device and the steps for storing and printing the whole screen. The diagram describes in greater detail the controller 100 of the conventional picture print device shown in FIG. 1.

The following description describes a technique for sequentially storing the digital signals of the whole screen. First, a control part 101 outputs a row clock signal and a column clock signal to a row and column address generating part 102 according to the commands of a microcomputer 70. In addition, the control part 101 outputs control signals to a multiplexer 103 and a memory cell 40.

The row and column address generating part 102 generates a row address and a column address based on the row clock signal and the column clock signal of the control part 101 and outputs the row address and column address to the multiplexer 103. The multiplexer 103 multiplexes the row address and column address according to the control signal of the control part 101. Subsequently the multiplexer 103 outputs the multiplexed address to the memory cell 40.

The analog/digital converter 30 receives the red, green, and blue matrix signals from the decoder 20 and converts these matrix signals to digital signals. The digital signals are sequentially written to the addresses of the memory cell 40 based on the addresses generated by the row and column address generating part 102. After the digital signals are stored, the data may be sequentially read from the memory cell 40 according to the addresses and the control signals generated by the controller 100 and output to the digital/analog converter 50. The digital/analog converter 50 converts the digital signals into analog red, green, and blue matrix signals, and the analog signals are input by the encoder 60. The encoder 60 encodes the analog red, green and blue matrix signals and converts them into the complex image signals to be output.

In addition, the process of outputting the signals stored in the memory cell 40 to the print processor is the same as the one described in FIG. 1. Thus, the picture displayed on the whole screen is printed on the photographic paper, as shown in the circuit diagram of FIG. 1.

By printing the picture as represented by all of the complex image signals, the conventional device cannot print a portion of the whole picture (i.e. a predetermined area) that the user wants to print.

SUMMARY OF THE INVENTION

The principal object of the present invention is to solve the above-identified problems.

An object of the present invention is to provide a picture print controlling device that may select a predetermined area of an whole screen displayed on a monitor and print only the predetermined area according to designated addresses. The present invention is also capable of storing a partial picture corresponding to the predetermined area so that only the picture of the predetermined area may be printed and the remaining part of the screen may not be printed.

These and other objects, features and advantages according to the present invention are provided by a picture print controlling device. Preferably, the picture print controlling device is a color video print device for selecting a portion of a picture displayed on a monitor and printing it on a photographic paper. The picture print controlling device advantageously includes:

Y/C converting means for dividing image signals into luminance signals and color signals;

decoding means for decoding said luminance signals and said color signals into input analog red, green and blue matrix signals;

analog-digital converting means for converting said input red, green, and blue matrix signals into digital signals, memory control means for controlling the generation of address data and for controlling a writing of said digital signals or a reading said digital signals from addresses of a memory cell, wherein said addresses corresponds to said address data;

a microcomputer for controlling at least one function of said memory controlling means, wherein said microcomputer outputs location data to said memory controlling means, wherein said location data defines a predetermined area of said partial picture to be printed;

digital-analog converting means for converting said digital signals read from the memory controlling means to output analog, red, green and blue matrix signals, encoding means for converting said output analog red green and blue matrix signals; and picture print means for storing said digital signals in a print memory of a print processor and printing said digital signals on a photographic paper via digital signal printing process.

These and other objects, features and advantages of the invention are disclosed in or will be apparent from the following description of preferred embodiments.

BRIEF DESCRIPTION OF THE DRAWINGS

The preferred embodiments are described with reference to the drawings in which like elements are denoted by like or similar numbers and in which.

DETAILED DESCRIPTION OF THE PREFERRED EMBODIMENT

Figure 5:
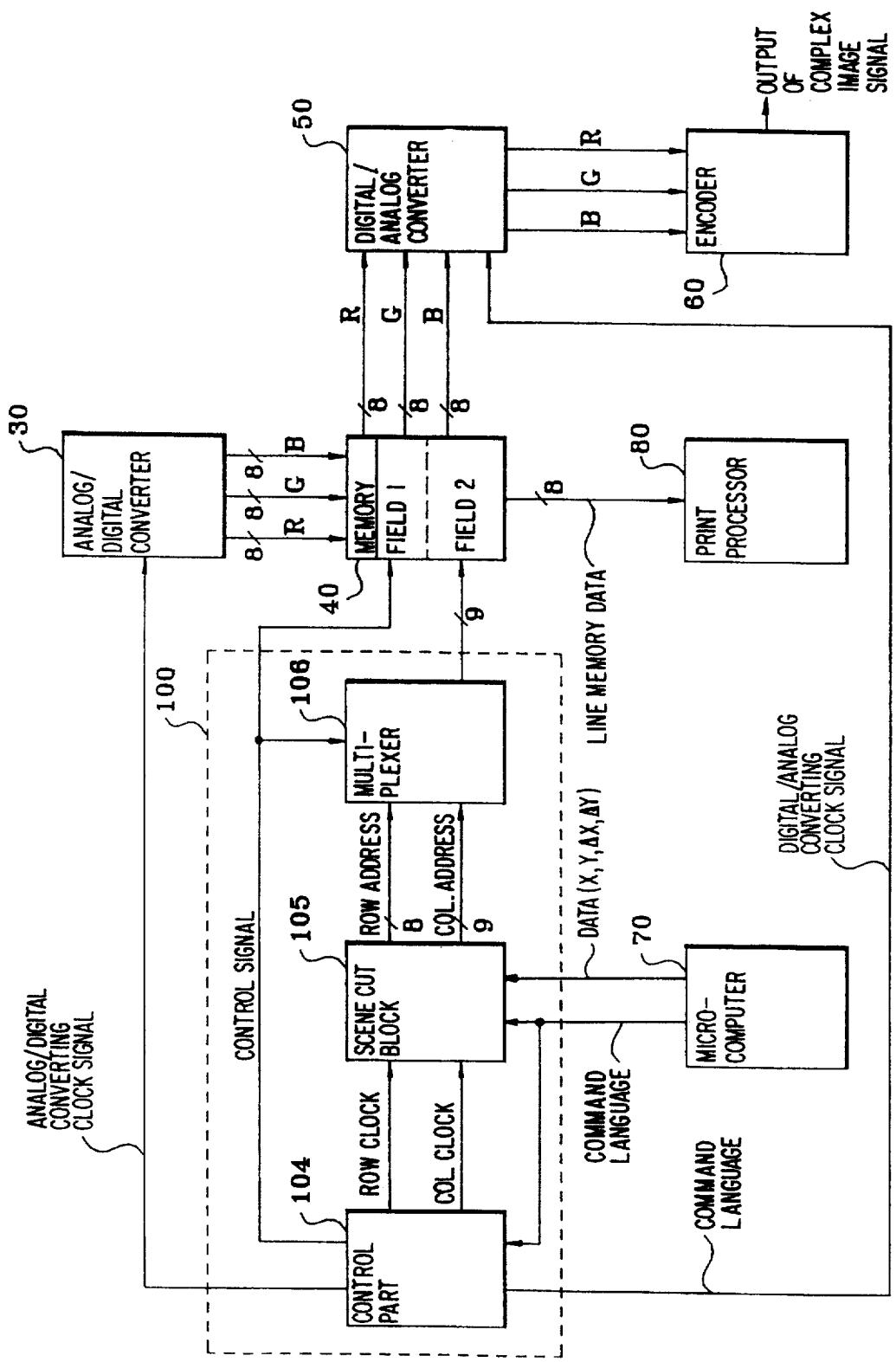
FIG. 5 is a block diagram of a picture print controlling device in accordance with the present invention.

FIG. 5 is a block diagram of a picture print controlling device in accordance with the present invention. The block diagram will be used to explain the steps for cutting a predetermined area of the whole screen of a monitor and assigning addresses thereto.

An output port of a microcomputer 70 for outputting command language is connected to an input port of a control part 104 and an input port screen cut block 105. An output port of the microcomputer 70 for outputting data is connected to the input port of the screen cut block 105. An output port of the control part 104 for outputting a control signal is connected to an input port of a multiplexer 106 and an input port of a memory cell 40. Output ports of the control part 104 for outputting a row clock signal and a column clock signal are respectively connected to input ports of the screen cut block 105. An 8 bit data line representing a row address and a 9 bit data line representing a column address generated by the screen cut block 105 are respectively connected to the multiplexer 106. A 9 bit data line of the multiplexer 106 is connected to the memory cell 40.

An analog/digital converter 30 receives input red, green, and blue matrix signals and converts the input red, green, and blue matrix signals into digital signals. The analog/digital converter 30 outputs the digital signals via three 8 bit data buses to the memory cell 40 in order to store the digital signals in the memory cell 40. The memory cell 40 can output the stored digital signals via three 8 bit data bases to a digital/analog converter 50. The digital/analog converter 50 converts the digital signals to output analog red, green, and blue matrix signals. The output analog red, green, and blue matrix signals are output to an encoder 60. The encoder 60 converts the analog signals into complex image signals, and the converted complex image signals are subsequently output to the monitor. In addition, the memory cell 40 can also output the digital signals representing a picture signal to a print processor 80. The digital signals are output to the print processor 80 from the memory cell 40 according to the control signal of the control part 104.

Referring to FIG. 5, the control part 104 outputs a row clock signal and a column clock signal to the screen cut block 105 according to the command language signal of the microcomputer 70. The control part 104 also outputs control signals to the multiplexer 106 and memory cell 40.

The screen cut block 105 counts the pulses of the row clock signals and column clock signals input from the control part 104 and generates row and column addresses of the predetermined area. In order to generate the row and column addresses of the predetermined area, the screen cut block 105 receives starting location data X and starting location data Y from the microcomputer 40. The starting location data X and starting location data Y represent the X and Y coordinates of the origin of a desired predetermined area of the screen to be printed. Location data ΔX and location data ΔY are also input from the microcomputer 40. The location data ΔX indicates how many columns of the whole screen from the origin X, Y will be included in the predetermined area. Similarly, the location data ΔY indicates how many rows of the whole screen from the origin X, Y will be included in the predetermined area. The calculations of the screen cut block are output to the multiplexer 106.

The multiplexer 106 multiplexes row and column addresses input from the screen cut block 105 outputs the data to the memory cell 40 according to the control signal of the control part 104. The memory cell 40 sequentially stores the digital signals output from the analog/digital converter 30 in the designated row and column addresses. The stored digital signals are sequentially read according to the designated addresses and output to the digital/analog converter 50. In addition, stored digital signals which represent the picture signals of the predetermined area of the screen to be printed may also be output to the print processor 80 according to the control signal of the control part 104.

Accordingly, the stored digital signals representing the picture signals of the selected predetermined area are stored in designated row and column addresses in the memory cell 40 which are distinguishable from the addresses of the remaining picture signals. Therefore, the picture signals of only the predetermined area may be printed without printing the picture signals of the other areas of the screen. The unprinted picture signals may also be converted into a white color equal to the background of the photographic paper in order to prevent them from being printed.

If the digital signals are output to the digital/analog converter 50, the digital/analog converter 50 converts the digital signals into output analog red, green, and blue matrix signals and outputs the analog signals to the encoder 60. The encoder 60 encodes the analog signals thereby converting them into the complex image signals. Subsequently, the complex image signals are output to the monitor.

The monitor screen displays the whole screen, including the portion of the screen defining the predetermined area. In other words, even though the present invention may print just the predetermined area, the device is still able to compile and print the whole picture.

Figure 6:
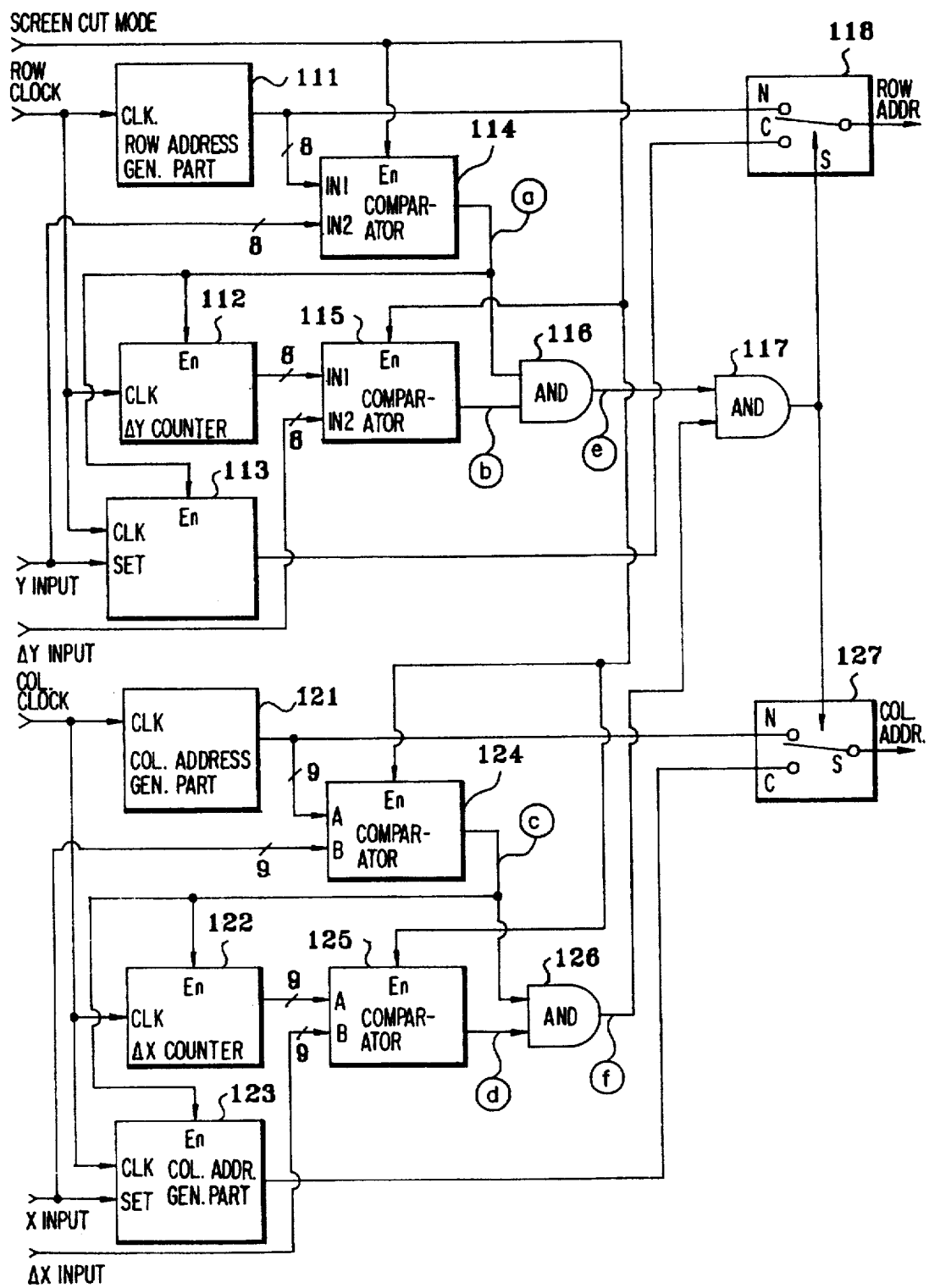
FIG. 6 is a detailed circuit diagram of the screen cut block of the present invention.

The circuitry used to determine the addresses of the predetermined area of the overall screen is further illustrated in FIG. 6. FIG. 6 is a detailed embodiment of the screen cut block 105 of FIG. 5. As shown in FIG. 6, the screen cut block 105 enables the present invention to store the partial picture of the predetermined area in a group of designated addresses in the memory cell 40 which are separate from the group of addresses that contain the remainder of the whole picture.

As shown in FIG. 6, the screen cut block 105 comprises a row address designating portion and a column address designating portion. The row address designating portion comprises a row address generating part 111, a row address generating part 113, a comparator 114, a comparator 115, a ΔY counter 112, and an AND gate 116.

A clock terminal CLK of the row address generating part 111 receives the row clock signal from the control part 104. The row address generating part 111 outputs a signal to an input terminal N of a switch 118 and an input terminal IN1 of the comparator 114. An enable terminal En of the comparator 114 inputs a screen cut mode control signal from the microcomputer 70. In addition, input terminal IN2 of the comparator 114 inputs the location data Y from the microcomputer 70. The output of the comparator 114 is input by an enable terminal En of the ΔY counter 112 and an enable terminal En of the row address generating part 113. In addition, the output of the comparator 114 is transmitted to an input terminal of the AND gate 116.

A clock terminal CLK of the ΔY counter 112 receives the row clock signal from the control part 104. The ΔY counter 112 outputs 8 parallel data bits to an input terminal IN1 of the comparator 115. An input terminal IN2 of the comparator 115 receives the location data ΔY from the microcomputer 70, and an enable terminal En of the comparator 115 inputs the screen cut mode control signal from the microcomputer 70. The output of the comparator 115 is also transmitted to an input terminal of the AND gate 116.

A clock terminal CLK of the row address generating part 113 receives the row clock signal from the control part 104. A set terminal of the row address generating part 113 receives the location data Y from the microcomputer 70. Furthermore, an output terminal of the row address generating part 113 is connected to an input terminal C of the switch 118.

Similarly, the column address designating portion of the screen cut block 105 comprises a column address generating part 121, a column address generating part 123, a comparator 124, a comparator 125, a ΔX counter 122, and AND gate 126.

A clock terminal CLK of the column address generating part 121 receives a column clock signal from the control part 104. An output terminal of the column address generating part 121 is connected to an input terminal N of a switch 127 and to an input terminal A of the comparator 124. An enable terminal En of the comparator 124 receives the screen cut mode control signal from the microcomputer 70. In addition, an input terminal B of the comparator 124 receives location data X from the microcomputer 70. The output terminal of the comparator 124 is connected to an enable terminal En of the ΔX counter 122, to an enable terminal En of the column address generating part 123, and to an input of the AND gate 126.

A clock terminal CLK of the ΔX counter 122 receives a column clock signal from the control part 104. An output terminal of the ΔX counter 122 is connected to an input terminal A of the comparator 125. An input terminal B of the comparator 125 receives location data signal ΔX from the microcomputer 70, and an enable terminal En of the comparator 125 receives the screen cut mode control signal from the microcomputer 70. An output terminal of the comparator 125 is connected to an input terminal of the AND gate 126.

A clock terminal CLK of a column address generating part 123 receives a column clock signal from the control part 104. A set terminal SET of the column address generating part 123 receives location data X from the microcomputer 70. In addition, an output terminal is connected to an input terminal C of the switch 127.

Each input terminal of the AND gate 117 is connected to an output terminal of the AND gate 116 and an output terminal of the AND gate 126, respectively. The output terminal of the AND gate 117 is connected to each switching control terminals of the switches 118 and 127.

Figure 1:
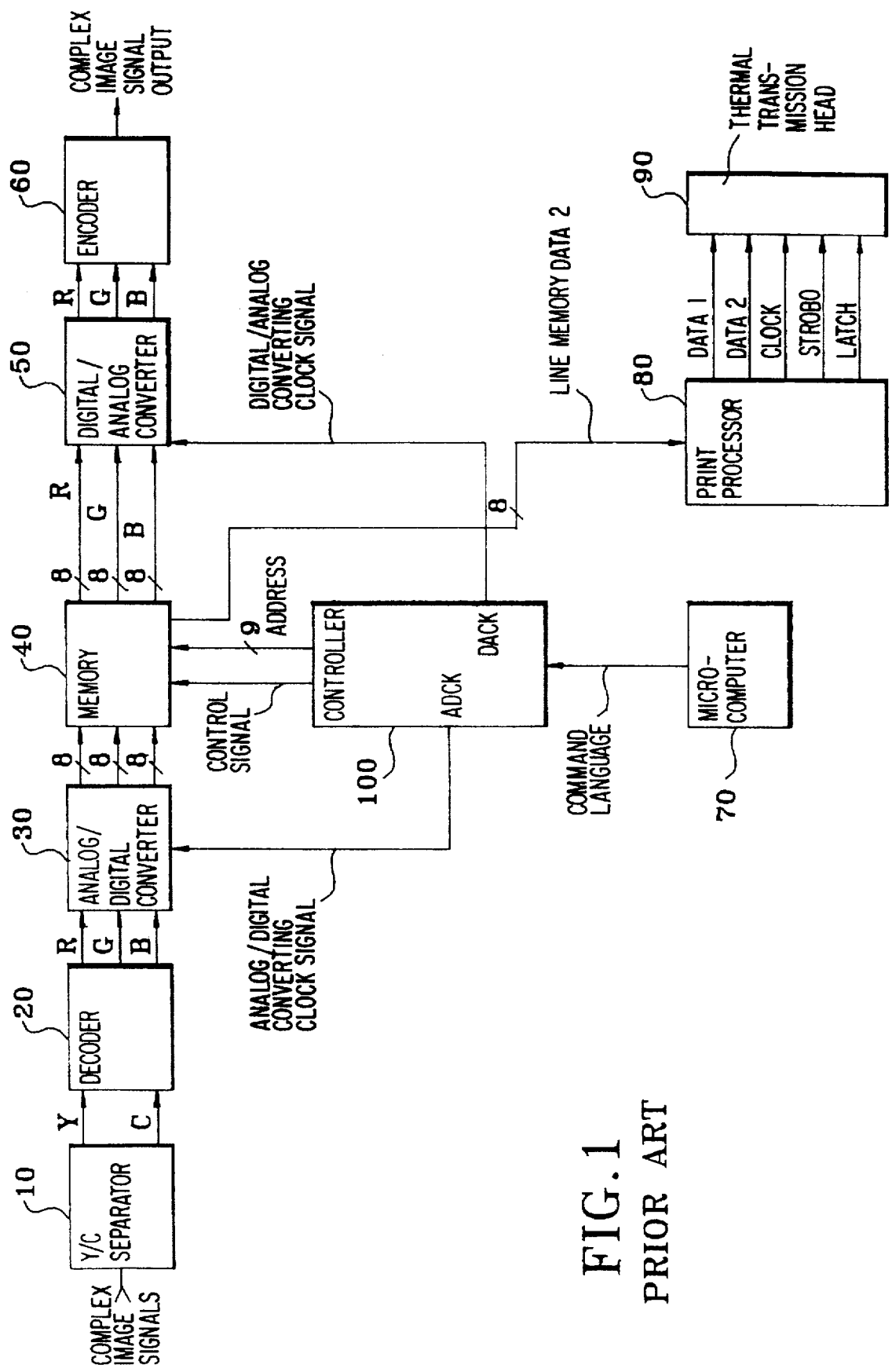
FIG. 1 shows a conventional picture print device.
Figure 2B:
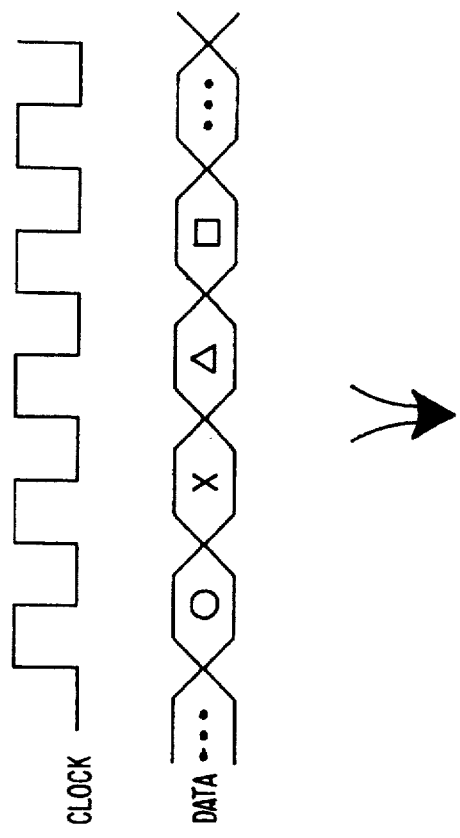
FIG. 2B shows digital image data.
Figure 2C:
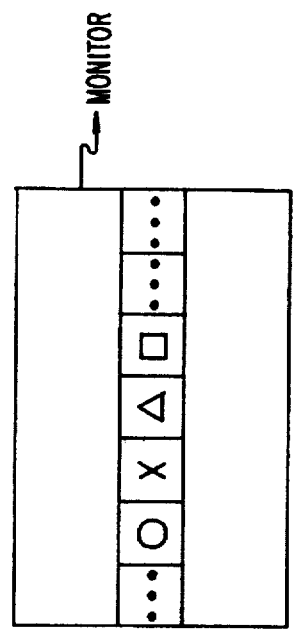
FIG. 2C shows data displayed in a monitor.
Figure 2A:
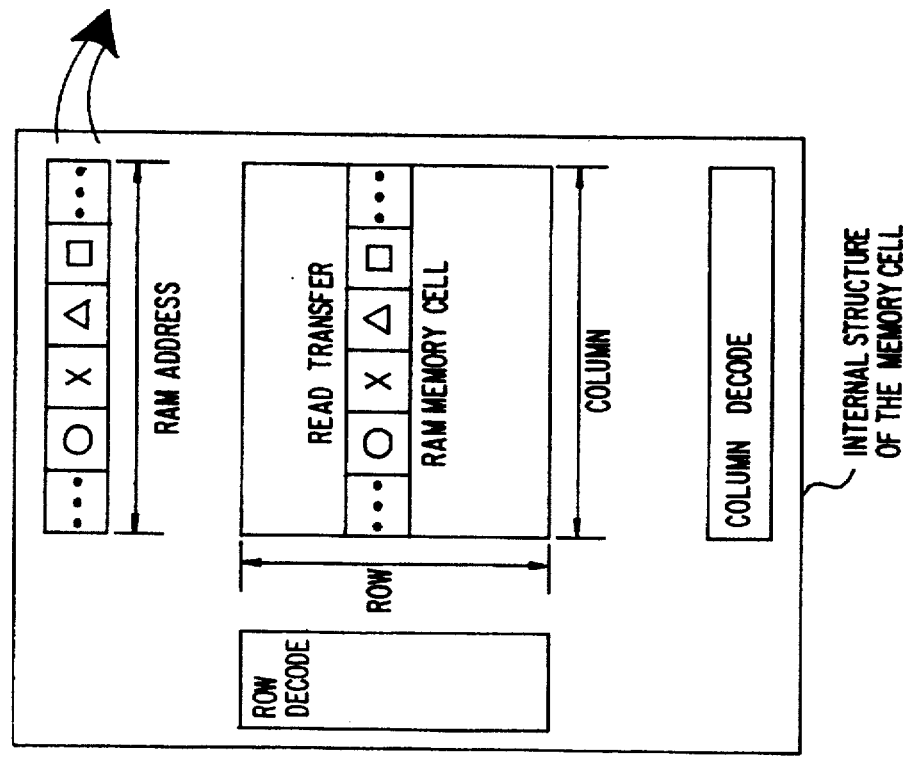
FIG. 2A shows a representative diagram of the internal structure of a memory cell of the conventional print device.
Figure 3:
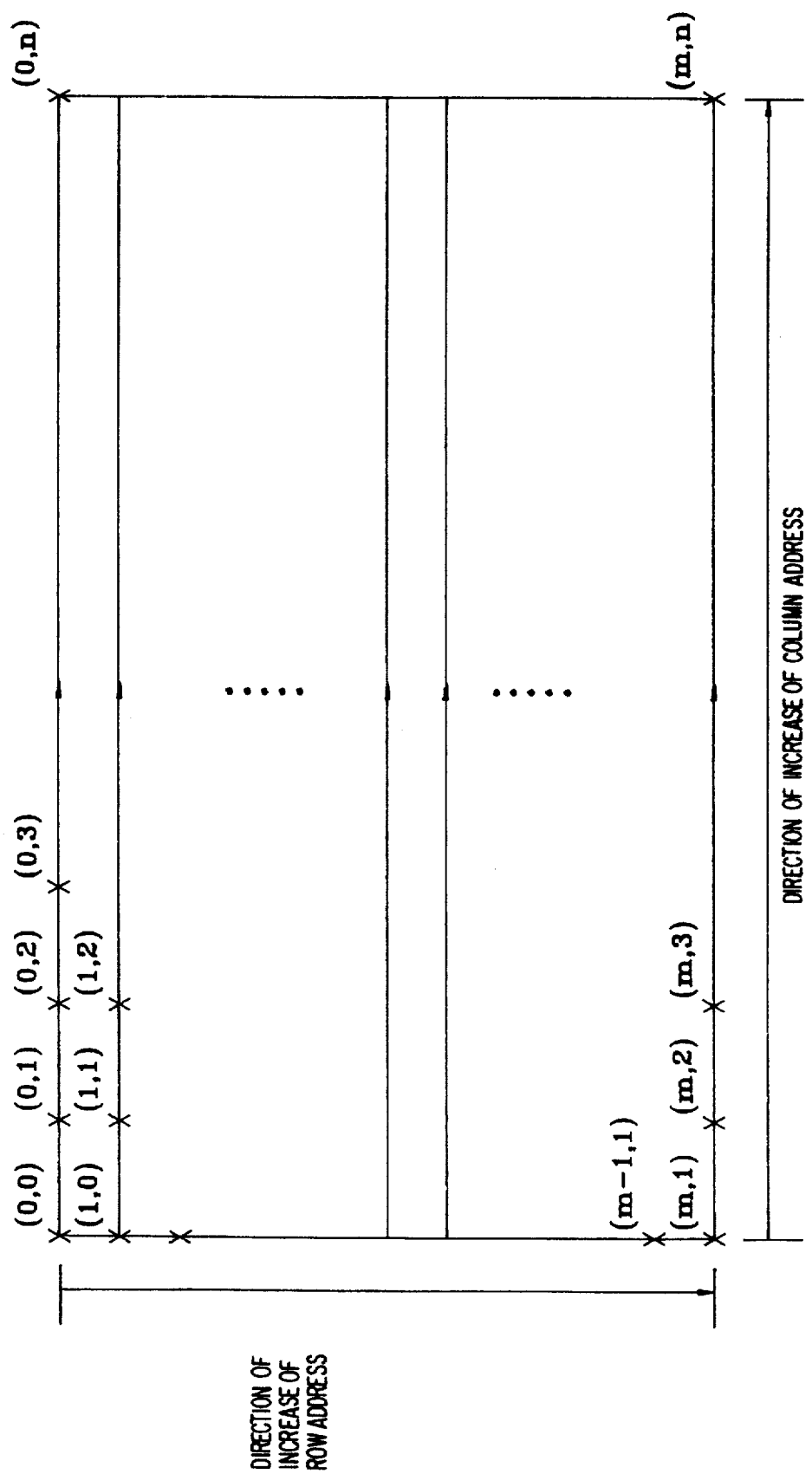
FIG. 3 shows a manner of designating addresses for storing data in a memory cell based on the partition of a screen.
Figure 4:
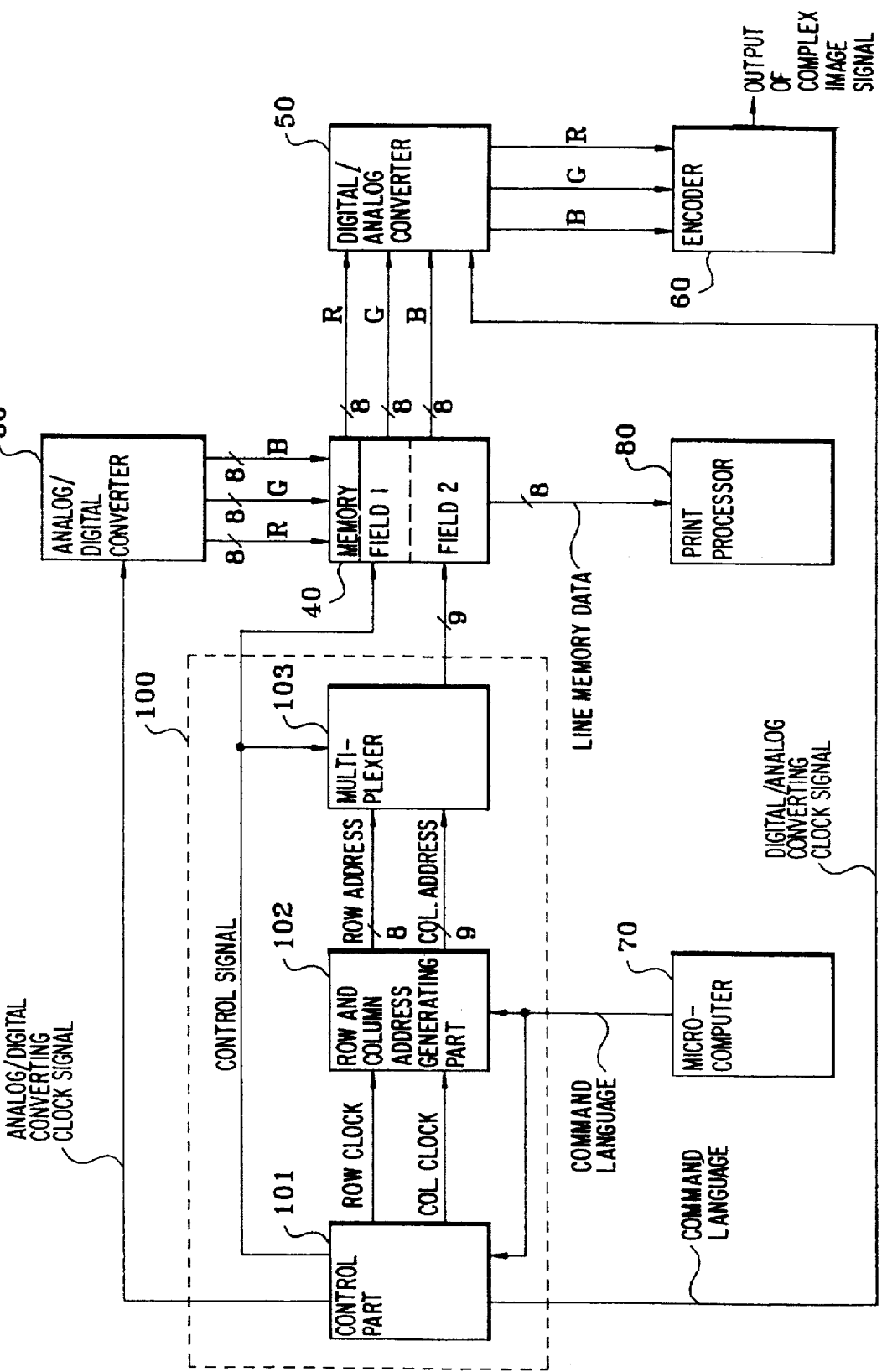
FIG. 4 shows a more detailed block diagram of the controller a conventional picture print controlling device.

The operation of the row address designating portion of the screen cut block 105 as shown in FIG. 6 is as follows. The row address generating part 111 counts each of the m row addresses (FIG. 3) of the whole screen according to the row clock signal from the control part 104 and sequentially generates each row address of the whole screen based on the row clock signal. The row address generating part 111 outputs each row address of the whole screen to the input port N of the switch 118.

When the comparator 114 is enabled by the screen cut mode control signal from the microprocessor 70, the comparator 114 compares an 8 bit row address output from the row address generating part 111 with an initial row address of the predetermined area (location data Y) from the microcomputer 70. The initial row address represents the first row address which constitutes the predetermined area of the screen.

Figure 7A:
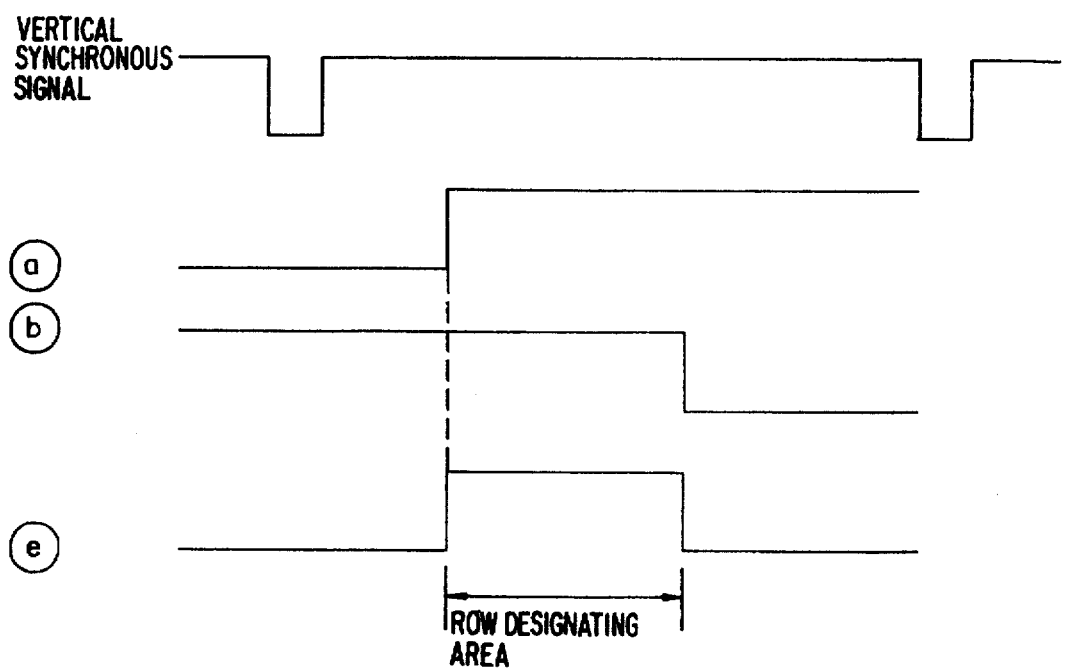
FIG. 7A is a timing diagram to determine the predetermined area of a portion of a screen that is to be designated as a row address.

When the location data Y equals the row address output by the row address generating part 111, an output of the comparator 114 becomes high as shown in a in FIG. 7A. When the output of the comparator 114 becomes high, the ΔY counter 112 is enabled to count the number of sequential row addresses (ΔY). The number of sequential row addresses (ΔY) counted represents how many rows the predetermined area of the partial picture will contain. The control part 104 controls the timing of the ΔY counter 112 while the ΔY counter is counting the sequential row addresses ΔY via the row clock signal.

The comparator 115 is enabled according for the screen cut mode control signal input from the microcomputer 70 (i.e. at the same time as the comparator 114 is enabled). After it is enabled, the comparator 115 sequentially compares each row address counted in the ΔY counter 112 with the location data ΔY. The location data ΔY represents a row address of the predetermined area of the cut picture as computed by the microcomputer 70. The location data ΔY signal becomes low when the last row address of the predetermined area has been counted, as shown in b of FIG. 7A.

The row address generating part 113 counts and sequentially generates each row addresses of the predetermined area of the partial picture when the output signal of the comparator 114 is high. The output signal of the comparator 114 becomes high when the first row address (location data Y) of the predetermined area of the partial picture equals the row address generated by the row address generating part 111. The row address generating part 113 sequentially increases and outputs each row address according to the timing of the row clock signal. The row address generating part 113 stops increasing each row address when an output signal of the comparator 114 becomes low.

The AND gate 116 outputs a high signal when the signals input from the comparator 114 and from the comparator 115 are high, (i.e., when the row address output by the row address generating part 111 corresponds to a row address of the predetermined area of the partial picture, as shown in e of FIG. 7A).

The operation of the column address designating portion of the screen cut block is as follows.

The column address generating part 121 counts each of the n column addresses (FIG. 3) of the whole screen according to the column clock signal input from the control part 104 and generates each column address of the whole screen based on the column clock signal. The column clock address generating part 121 outputs each column address of the whole screen to the input port N of the switch 127.

When the comparator 124 is enabled according to the screen cut mode control signal input from the microcomputer 70, the comparator 124 compares a column address generated by the column address generating part 121 with a column address (location data X) of the first column of the predetermined area of the cut picture.

Figure 7B:
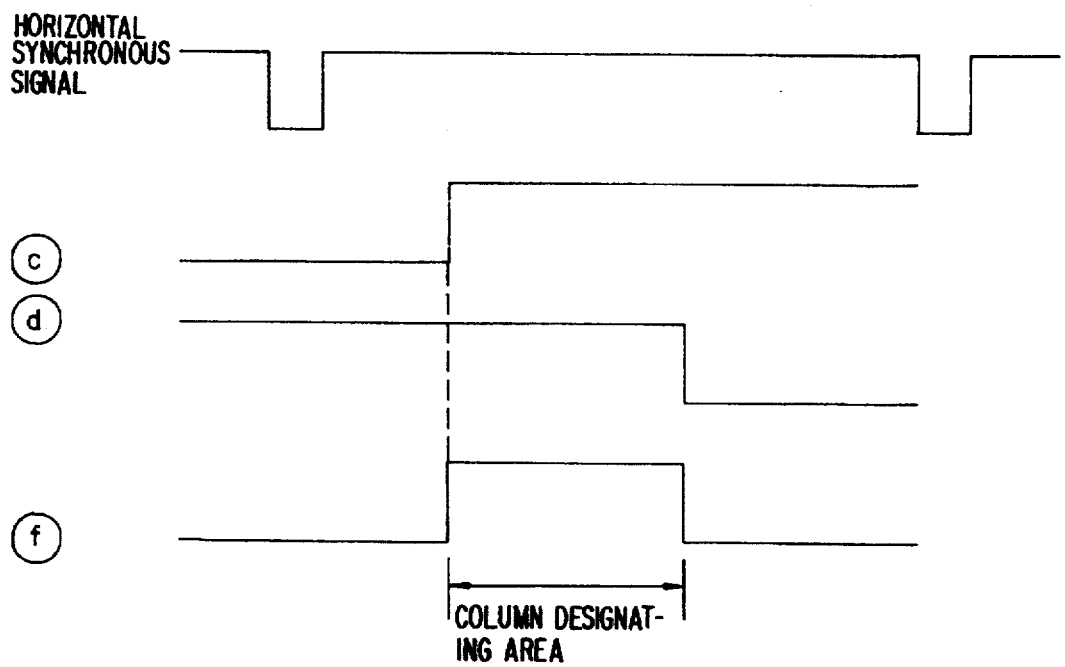
FIG. 7B is a timing diagram to determine the predetermined area of a portion of a screen that is to be designated as a column address.

When the location data X equals to column address output by the column address generating part 121, an output signal of the comparator 124 becomes high as shown in c of FIG. 7B. When the output signal of the comparator 124 becomes high, the ΔX counter 122 is enabled to count the number of sequential column addresses (ΔX). The number of sequential column addresses (ΔX) counted represents how many columns the predetermined area of the partial picture will contain. The control part 104 controls the timing of the ΔX counter while the ΔX counter is counting the sequential column addresses ΔX via the column clock signal.

The comparator 125 is enabled according to the screen cut mode control signal input from the microcomputer 70 (i.e. at the same time as the comparator 124 is enabled). After it is enabled, the comparator 125 sequentially compares each column address counted in the ΔX counter 122 with the location data ΔX. The location data ΔX represents a column address of the predetermined area of the cut picture computed by the microcomputer 70. The location data ΔX signal becomes low when the last row address of the predetermined area has been counted, as shown in d of FIG. 7B.

The column address generating part 123 counts and sequentially generates each column address of the predetermined area of the partial picture when the output signal of the comparator 124 is high. The output signal of the comparator 124 becomes high when the first column address (location data X) of a predetermined area of the partial picture equals the column address generated by the column address generating part 121. The column address generating part 123 sequentially increases and outputs each column address according to the timing of the column clock signal. The column address generating part 123 stops increasing and outputting each column address when an output signal of the comparator 124 becomes low.

The AND gate 126 outputs a high signal when the signals input from the comparator 124 and from the comparator 125 are high (i.e. when the column address output by the column address generating part 121 corresponds to a column address of the predetermined area of the partial picture as shown in f of FIG. 7B).

The AND gate 117 outputs a high signal when all the signals input from the AND gate 116 and from the AND gate 126 are high (i.e. when both a row address output by the row address generating part 111 and a column address output by the column address generating part 121 are equal to a row address and a column address of the predetermined area).

The switch 118 outputs either a row address output from the row address generating part 111 or a row address output from the row address generating part 113 depending on the switching signal area from the AND gate 117.

The switch 127 outputs either a column address output from the column address generating part 121 or a column address output from the column address generating part 123 depending on the switching signal input from the AND gate 117.

From the foregoing description, it will be appreciated that the row address generated by the row address generating part 111 and the column address generated by the column address generating part 121 constitute the addresses for the entire screen, which can be printed during a screen printing mode of operation. Advantageously, the row address generated by the row address generation part 113 and the column address generated by the column address generating part 123 are the address representing a partial picture, i.e., a selected portion of the screen, which can be printed during a screen cut mode of operation. It will also be noted that the addresses generated by the row address generating part 113 and the column address generating part 123 are the row and column addresses representing each screen saved in memory cell 40 on an per field basis. Thus, as a result of the logical combination of the screen cut mode signal and data, e.g., X, Y, ΔX and ΔY, provided by microcomputer 70, the row addresses and the column addresses output from switches 118 and 127 included in screen cut block 105 selectively output the addresses corresponding to a whole screen for printing, i.e., addresses from generating parts 111 and 121, or the addresses corresponding to a partial screen, i.e., addresses from generating parts 113 and 123. Therefore, the predetermined area is not fixed in memory cell 40.

After the row addresses located in the predetermined area of the partial picture are separated from the column addresses by the multiplexer 106, the row addresses and column addresses are stored in the memory cell 40. The picture signals which are stored in the address locations which correspond to both the separated row addresses and the column addresses are sequentially read. Afterwards, the partial picture corresponding to the picture signals is printed on a photographic paper via a print processor 80 by a thermal transmission head 90.

When the complex image signals are stored and the picture displayed on the screen is printed on a photographic paper according to the picture print controlling device, the addresses of the predetermined area of the cut picture are separated from the addresses of the remaining portions of the screen. Subsequently, the signals representing the predetermined area are stored in designated addresses within the memory cell 40 so that just the picture of the predetermined area is printed and the rest of the screen is not printed.

If printed, data of the designated addresses are sequentially read. Thus, just the picture of the predetermined area within the whole screen may be selected and printed. In addition, the size and location of the selected predetermined area of the cut picture may be varied according to the user's will.

While this invention has been described in connection with what is presently considered to be the most practical and preferred embodiments, it is to be understood that the invention is not limited to the disclosed embodiments and is intended to cover various modifications and equivalent arrangements included within the spirit and scope of the appended claims.

What is claimed is:

1. A picture print controlling device for selecting a partial area of a picture displayed on a screen of a monitor to print on a photographic paper, comprising:

Y/C separating means for dividing input image signals into luminance signals and color signals;

decoding means for decoding said luminance signals and said color signals into input analog red, green, and blue matrix signals;

analog-digital converting means for converting said input analog red, green, and blue matrix signals into digital signals;

memory controlling means for controlling the generation of address data and for controlling a writing of said digital signals to or a reading of said digital signals from address locations of a memory cell, wherein said address, locations correspond to said address data;

a microcomputer for controlling at least one function of said memory controlling means, wherein said microcomputer outputs location data to said memory controlling means and wherein said location data defines said partial area of said picture to be printed;

digital-analog converting means for converting said digital signals read from said memory cell to output analog red, green, and blue matrix signals;

encoding means for converting said output analog red, green, and blue matrix signals into output image signals; and picture print means for storing said digital signals in a print memory of a print processor and printing said digital signals on a photographic paper via a digital signal printing process.

2. The picture print controlling device as claimed in claim 1, wherein said memory controlling means comprises:

a control part for generating row clock signals, column clock signals, and a control signal, wherein said row clock signals and said column clock signals are output to a screen cut block circuit and wherein said control signal controls a multiplexer;

said screen cut block circuit which generates row addresses and column addresses for storing said digital signals relating to said picture in said memory cell, wherein said row and column addresses are generated according to a command and said location data input from said microcomputer, wherein said row and column addresses comprise distinctive row and column addresses and general row and column addresses, wherein said distinctive row and column addresses relate to said address locations of said memory cell in which said digital signals relating to said partial area of said picture are stored and wherein said general row and column addresses relate to said address locations in which said digital signals relating to an area of said picture other than said partial area are stored, and wherein said distinctive row and column addresses are distinguishable from said general row addresses and column addresses; and said multiplexer which multiplexes said row addresses and said column addresses input from said screen cut block circuit according to said control signal of said control part and which outputs said row addresses and said column addresses to said memory cell as said address data.

3. The picture print controlling device as claimed in claim 2, wherein said screen cut block circuit comprises:

row address designating means for generating said general row addresses based on said row clock signals from said control part and for comparing said general row addresses with a row address location data to determine at a least one of said distinctive row addresses, wherein said row address location data is part of said location data input from the microcomputer; and column address designating means for generating said general column addresses based on said column clock signals from said control part and comparing said general column addresses with column address location data to determine at least one of said distinctive column addresses, wherein said column address location data is part of said location data input from the microcomputer.

4. The picture print control device as claimed in claim 3, wherein said row address designating means comprises:

a first row address generating part for generating said row addresses of said picture according to said row clock signals;

a first comparator which compares said general row addresses with said row address location data, wherein said row address location data defines a first row address of said partial area of said picture, wherein said first comparator compares said general row addresses with said row address location data when a screen cut mode control signal input from said microcomputer enables said first comparator, and wherein said first comparator outputs a first comparator output signals when one of said general row addresses equals said row address location data;

a data ΔY counter which counts and generates a sequentially increasing amount of said row addresses starting with said first row address of said partial area according to said row clock signals when said first comparator output signal of said first comparator enables said data ΔY counter;

a second comparator which compares said sequentially increasing amount of said row addresses generated by said data ΔY counter with incremental row address location data, wherein said incremental row address location data is part of said location data output from said microcomputer and wherein said second comparator compares said sequentially increasing amount of said row addresses with said incremental row address location data when said screen cut mode control signal input from said microcomputer enables said second comparator;

a second row address generating part which begins generating said distinctive row addresses of said partial area of said picture according to said row clock signals when said first comparator outputs said first comparator output signal;

a first AND gate which outputs a high signal when both of said first comparator output signal of said first comparator and a second comparator output signal of said second comparator are high;

a second AND gate which outputs a high signal when a first AND gate output signal from said first AND gate and a third AND gate output signal from a third AND gate are high; and first switching means for switching between said general row addresses input from said first row address generating part and said distinctive row addresses input from said second row address generating part according to a switching signal input from said second AND gate.

5. The picture print control device as set forth in claim 3, wherein said column address designating means comprises:

a first column address generating part for generating said general column addresses of said picture according to said column clock signals;

a third comparator which compares said general column addresses with said column address location data, wherein said column address location data defines a first column address of said partial area of said picture, wherein said third comparator compares said general column addresses with said column address location data when a screen cut mode control signal input from said microcomputer enables said third comparator, and wherein said third comparator outputs a third comparator output signal when one of said general column addresses equals said column address location data;

a data ΔX counter which counts and generates a sequentially increasing amount of said column addresses starting with said first column address of said partial area according to said column clock signals when said third comparator output signal of said third comparator enables said data ΔX counter;

a fourth comparator which compares said sequentially increasing amount of said column addresses generated by said data ΔX counter with incremental column address location data, wherein said incremental column address location data is part of said location data output from said microcomputer and wherein said fourth comparator compares said sequentially increasing amount of said column addresses with said incremental column address location data when said screen cut mode control signal input from said microcomputer enables said fourth comparator;

a second column address generating part which begins generating said distinctive column addresses of said partial area of said picture according to said column clock signals when said third comparator outputs said third comparator output signal;

a third AND gate which outputs a high signal when both of said third comparator output signal of said third comparator and a fourth comparator output signal of said fourth comparator are high;

a second AND gate which outputs a high signal when a third AND gate output signal from said third AND gate and a first AND gate output signal from a first AND gate are high; and second switching means for switching between said general column addresses input from said first column address generating part and from said distinctive column addresses input from said second column address generating part according to a switching signal input from said second AND gate.

6. The picture print control device as set forth in claim 4, wherein said column address designating means comprises:

a first column address generating part for generating said general column addresses of said picture according to said column clock signals;

a third comparator which compares said general column addresses with column address location data, wherein said column address location data defines a first column address of said partial area of said picture, wherein said third comparator compares said general column addresses with said column address location data when said screen cut mode control signal input from said microcomputer enables said third comparator and wherein said third comparator outputs a third comparator output signal when one of said general column addresses equals said column address location data;

a data ΔX counter which counts and generates a sequentially increasing amount of said column addresses starting with said first column address of said partial area according to said column clock signals when said third comparator output signal of said third comparator enables said data ΔX counter;

a fourth comparator which compares said sequentially increasing amount of said column addresses generated by said data ΔX counter with incremental column address location data, wherein said incremental column address location data is part of said location data output from said microcomputer and wherein said fourth comparator compares said sequentially increasing amount of said column addresses with said incremental column address location data when said screen cut mode control signal input from said microcomputer enables said fourth comparator;

a second column address generating part which begins generating said distinctive column addresses of said partial area of said picture according to said column clock signals when said third comparator outputs said third comparator output signal;

said third AND gate which outputs a high signal when said third comparator output of said third comparator and a fourth comparator output of said fourth comparator are high;

second switching means for switching between said general column addresses input from said first column address generating part and from said distinctive column addresses input from said second column address according to said switching signal input from said second AND gate.

7. The picture print controlling device as set forth in claim 1, wherein said microcomputer is capable of outputting at least two sets of location data which respectively define two different partial areas of said picture to be printed.

8. The picture print controlling device as set forth in claim 7, wherein said wherein said location data is capable of defining any partial area of said picture to be printed.

9. The picture print controlling device as set forth in claim 8, wherein a user selects said partial area of said picture to be printed.

* * * * *